(12) United States Patent
Arvidsson et al.

(10) Patent No.: US 10,393,880 B2
(45) Date of Patent: Aug. 27, 2019

(54) VEHICLE CONTROL THROUGH MACHINE LEARNING

(71) Applicant: VOLVO CAR CORPORATION, Gothenburg (SE)

(72) Inventors: Rickard Arvidsson, Odsmal (SE); Niklas Akerblom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/850,037

(22) Filed: Sep. 10, 2015

(65) Prior Publication Data

US 2016/0075341 A1 Mar. 17, 2016

(30) Foreign Application Priority Data

Sep. 17, 2014 (EP) ..................................... 14185065

(51) Int. Cl.
*G01S 19/42* (2010.01)
*B60W 50/00* (2006.01)
*B60K 6/46* (2007.10)

(52) U.S. Cl.
CPC ................ *G01S 19/42* (2013.01); *B60K 6/46* (2013.01); *B60W 50/0097* (2013.01);
(Continued)

(58) Field of Classification Search
CPC ............... B60W 20/12; B60W 50/045; B60W 30/1882; B60W 50/0097;
(Continued)

(56) References Cited

U.S. PATENT DOCUMENTS 6,570,608 B1 5/2003 Tserng
6,672,415 B1 1/2004 Tabata
(Continued)

FOREIGN PATENT DOCUMENTS

CN 1891548 A 1/2007
CN 104296762 A 1/2015
(Continued)

OTHER PUBLICATIONS

Extended European Search Report for European Application No. 14185065.1, Completed by the European Patent Office, dated Apr. 2, 2015, 6 pages.
(Continued)

*Primary Examiner* — Isaac G Smith
(74) *Attorney, Agent, or Firm* — Brooks Kushman P.C.

(57) ABSTRACT

A method is disclosed for managing rules or policies in a vehicle having a controllable unit. The method may include determining, at the start of a driving, an active route of the vehicle, selecting a set of control values from multiple stored sets of control values, where one control value of the set of control values corresponds to one predetermined interval of the determined active route, and controlling the at least one controllable unit based on the selected set of control values. The method may also include recording, during the current driving of the vehicle, a set of control result values, where one control result value corresponds to a predetermined interval of the determined active route which the vehicle has driven and, at the end of the driving based on the set of control result values, determining and storing an updated set of control values for the actually driven route.

12 Claims, 3 Drawing Sheets

(52) U.S. Cl.
CPC .............. *B60W 2050/0014* (2013.01); *B60W 2050/0089* (2013.01); *B60W 2550/402* (2013.01); *Y02T 10/6217* (2013.01); *Y10S 903/903* (2013.01)

(58) Field of Classification Search
CPC ....... B60W 2050/0089; G05B 13/0265; G01S 19/42; G01C 21/3469
USPC .......................................... 701/25, 22, 424
See application file for complete search history.

(56) References Cited

U.S. PATENT DOCUMENTS

| | | |
|---|---|---|
| 7,028,795 B2 | 4/2006 | Tabata |
| 7,273,120 B2 | 9/2007 | Tabata |
| 7,925,426 B2 | 4/2011 | Koebler et al. |
| 8,825,243 B2 | 9/2014 | Yang et al. |
| 9,346,469 B2 | 5/2016 | Glugla et al. |
| 9,409,563 B2 | 8/2016 | Yu et al. |
| 9,522,669 B2 | 12/2016 | Engman et al. |
| 2005/0274553 A1 | 12/2005 | Salman et al. |
| 2006/0142915 A1 | 6/2006 | Isono et al. |
| 2006/0208169 A1 | 9/2006 | Breed et al. |
| 2007/0047767 A1 | 3/2007 | Watabe |
| 2007/0191987 A1 | 8/2007 | Dang et al. |
| 2008/0278576 A1 | 11/2008 | Nishigaki et al. |
| 2008/0319596 A1 | 12/2008 | Yamada |
| 2009/0114463 A1 | 5/2009 | DeVault |
| 2009/0306866 A1* | 12/2009 | Malikopoulos ... B60W 30/1882 701/59 |
| 2010/0104199 A1 | 4/2010 | Zhang et al. |
| 2010/0286830 A1 | 11/2010 | Wijaya et al. |
| 2011/0066308 A1 | 3/2011 | Yang et al. |
| 2011/0166731 A1 | 7/2011 | Kristinsson et al. |
| 2011/0243383 A1 | 10/2011 | Oyaizu |
| 2011/0313647 A1 | 12/2011 | Koebler et al. |
| 2012/0179319 A1 | 7/2012 | Gilman et al. |
| 2012/0203409 A1* | 8/2012 | Sekijima ............ G01C 21/3469 701/22 |
| 2013/0166116 A1 | 6/2013 | Chen |
| 2013/0179007 A1 | 7/2013 | Dalum |
| 2013/0251193 A1 | 9/2013 | Schamp |
| 2013/0253746 A1 | 9/2013 | Choi et al. |
| 2013/0268150 A1 | 10/2013 | Weslati et al. |
| 2013/0332020 A1 | 12/2013 | Uchihara et al. |
| 2014/0018985 A1* | 1/2014 | Gupta .................. B60W 20/104 701/22 |
| 2014/0257608 A1* | 9/2014 | Dufford ................ B60W 20/40 701/22 |
| 2015/0025727 A1 | 1/2015 | Engman et al. |
| 2015/0127199 A1 | 5/2015 | Zhao et al. |
| 2015/0202990 A1 | 7/2015 | Grossard et al. |
| 2015/0224997 A1 | 8/2015 | Glugla et al. |
| 2015/0365664 A1 | 12/2015 | Yousefi et al. |

FOREIGN PATENT DOCUMENTS

| | | |
|---|---|---|
| DE | 102005024403 A1 | 1/2007 |
| DE | 102005035431 B3 | 4/2007 |
| DE | 102009028922 | 3/2011 |
| EP | 2136182 A1 | 12/2009 |
| EP | 2692604 | 2/2014 |
| EP | 2826688 A1 | 1/2015 |
| WO | 2012072094 A1 | 6/2012 |

OTHER PUBLICATIONS

Bagheri et al., Cloud-Based Pedestrian Road-Safety with Situation-Adaptive Energy-Efficient Communication; IEEE Intelligent Transportation Systems Magazine, 2016, vol. 8, Issue 3, pp. 45-62, DOI: 10.1109/MITS.2016.2573338.

Jiang et al., On-Road PHEV Power Management with Hierarchical Strategies in Vehicular Networks, IEEE Intelligent Vehicles Symposium Proceedings, 2014, pp. 1077-1084, DOI: 10.1109/IVS.2014.6856597.

Saikyo et al., Optimization of Energy Management System for Parallel Hybrid Electric Vehicles Using Torque Control Algorithm, Society of Instrument and Control Engineers of Japan (SICE), 2015 54th Annual Conference, pp. 1293-1298, DOE: 10.1109/SICE.2015.7285463.

Yunlong et al., Neural Network and Efficiency-Based Control for Dual-Mode Hybrid Electric Vehicles, Control Conference (CCC), 2015 34th Chinese, pp. 8103-8108, DOI: 10.1109/ChiCC.2015/260929.

Pang et al., Work-In-Progress: Industry-Friendly and Native-IP Wireless Communications for Building Automation, Industrial Networks and Intelligent Systems (INISCom), 2015 1st International Conference, pp. 163-167, DOI: 10.4108/icst.iniscom.2015.258563.

Zheng et al., Self-Optimizing Energy Management Strategy for Fuel-Cell/Ultracapacitor Hybrid Vehicles, Connected Vehicles and Expo. (ICCVE), 2013 International Conference, pp. 87-93, DOI: 10.1109/ICCVE.2013.6799775.

Qin et al., Cloud-Based Data Analytics Framework for Autonomic Smart Grid Management, Cloud and Autonomic Computing (ICCAC), 2014 International Conference, pp. 97-100.

Landi et al., A Remotely Controlled Onboard Measurement System for Optimization of Energy Consumption of Electrical Trains, Instrumentation and Measurement, IEEE Transactions 2008, vol. 57, Issue 10, pp. 2250-2256, DOI: 10.1109/TIM.2008.922110.

Peng et al., Power Management Strategy for A Parallel Hybrid Electric Truck, Control Systems Technology, IEEE Transactions 2003, vol. 11, Issue 6, pp. 839-849, DOI: 10.1109/TCST.2003.815606.

Murphey et al., Intelligent Hybrid Vehicle Power Control—Part II: Online Intelligent Energy Management, Vehicular Technology, IEEE Transactions 2013, vol. 62, Issue 1, pp. 69-79, DOI: 10.1109/TVT.2012.2217362.

Lee et al., Synthesis and Validation of Represnetative Real-World Driving Cycles for Plug-In Hybrid Vehicles, Vehicle Power and Propulsino Conference (VPPC), 2010 IEEE, pp. 1-6, DOI: 10.1109/VPPC.2010.5729040.

Szumanowski et al., Method of Battery Adjustment for Hybrid Drive by Modeling and Simulation, Vehicle Power and Propulsion, 2005 IEEE Conference, pp. 681-687, DOI: 10.1109/VPPC.2005.1554632.

European Patent Office, Extended European Search Report for European Application No. 13176803.8-1752, dated Dec. 3, 2013.

The State Intellectual Property Office of People's Republic of China, First Office Action for Chinese Application No. 201510570422.7, dated Nov. 5, 2018, 16 pages (including Translation).

The State Intellectual Property Office of People's Republic of China, Search Report for Chinese Application No. 201510570422.7, dated Oct. 24, 2018.

* cited by examiner

VEHICLE CONTROL THROUGH MACHINE LEARNING

CROSS-REFERENCE TO RELATED APPLICATIONS

This application claims foreign priority benefits under 35 U.S.C. § 119(a)-(d) to European patent application number EP 14185065.1, filed Sep. 17, 2014, which is incorporated by reference in its entirety.

TECHNICAL FIELD

The present disclosure relates to a method for managing rules and policies in a vehicle comprising at least one controllable unit. The present disclosure also relates to a system for managing rules and policies of a vehicle. The present disclosure also relates to a vehicle comprising a system for managing rules and policies.

BACKGROUND

Vehicles may be outfitted with a number of different powertrain assemblies, some of which represent a shift away from vehicles relying solely on internal combustion engines. This has led to developments such as electric vehicles and hybrids of electric and internal combustion engine driven vehicles which are gaining ground.

Hybrid Electric Vehicles, HEVs, are vehicles in which an internal combustion engine is combined with an electric propulsion system, e.g. an electric motor, in order to propel the vehicle. In many cases, the internal combustion engine will operate at fixed operating variables most suitable for the surrounding equipment such as a fixed revolutions per minute, RPM, and a non-varying fuel injection. For optimal fuel efficiency, both of the battery charge and the fuel of the internal combustion engine, the extent to which the internal combustion engine is used may differ in different driving scenarios. There is thus an interest in controlling the manner in which battery power being used or charged.

Several ways of controlling this exists, one of which is measuring the SoC levels of the battery pack, and instructing the internal combustion engine to charge the batteries when the SoC drops below a certain level. Another option is to allow the driver of the vehicle to decide when to turn on the internal combustion engine, or even set the SoC levels at which the internal combustion engine turns on. The internal combustion engine could also be turned on e.g. when the vehicle reaches high speeds, or when the driver requests a high amount of acceleration by pressing the accelerator substantially.

US20140018985A1 describes a powertrain of a Hybrid Electric Vehicle, HEV being controlled to determine how much battery power to be used by the powertrain. This is primarily based on instantaneous power requirements and a recharging rate of the battery to determine how much of the power produced by the powertrain is to originate from the engine and how much is to come from the battery. Further, a probability distribution over possible future paths of the vehicle is predicted and used to lower the energy expenditure of the vehicle, basing these possible future paths on past driver history. Further, a Bellman Equation is used as part of dynamic programming or a forward search algorithm to improve the energy expenditure.

While the powertrain according to US20140018985A1 might be useful in improving energy usage, there is still room for improvement.

SUMMARY

One object of the disclosure is to provide a method for managing rules or policies in a vehicle. Another object of the disclosure is to provide a system for managing rules or policies in a vehicle. Another object of the disclosure is to provide a vehicle comprising a system for managing rules or policies. It is also preferred that the method and system are not limited to controlling energy units such as e.g. engines or batteries, but be suitable for more general rules and/or policy management.

An object of the disclosure is achieved by a method according to the claims. In a method for managing rules or policies in a vehicle, the vehicle comprises at least one controllable unit.

The method comprises determining, at the start of a driving, an active route of the vehicle, and selecting a set of control values from a plurality of stored sets of control values, the plurality of sets of control values being based on a set of previously driven routes, where the selected set of control values corresponds to the determined active route, where one control value of said set of control values corresponds to one predetermined interval of the determined active route. The method further comprises controlling the at least one controllable unit based on the selected set of control values, and recording, during the current driving of the vehicle, a set of control result values, where one control result value corresponds to a predetermined interval of the determined active route which the vehicle has driven, and where the control result values are indicative of the result of the controlling during the predetermined interval. The method further comprises determining, at the end of the driving based on said set of control result values, an updated set of control values for the actually driven route, and storing said updated set of control values.

The method according to the disclosure allows the controllable unit to be controlled according to a selected set of control values corresponding to the determined active route of the vehicle. This means that the controllable unit can be controlled in such a way that is optimal for e.g. energy conservation or other purposes throughout the driving of the active route of the vehicle. The method also allows for control result values relevant to the current driving of the vehicle to be recorded and then be used to determine an updated set of control values for the actually driven route, which updated set of control values is then stored. In this way, an updated control scheme is achieved for the actually driven route based on parameters recorded during the trip, whereby when the same route is driven again, i.e. the same trip is undertaken again, the updated control values may be used which features more up to date and precise instructions for controlling the controllable unit. Thus, each trip produces more data which can be used to refine the rules and policies for that specific trip. A trip could be e.g. a morning commute to a job, a trip home from a supermarket, or a trip to the airport. Using a morning commute to a job as an example, each time the same trip is undertaken, e.g. taking the same route to the job, the control values corresponding to that particular trip is used to control the controllable unit in a way that is desirable for e.g. energy conservation, safety or comfort. Further, each time that particular trip is taken, the control values corresponding to that trip is improved using the data parameters collected during the trip. As a trip such as the commute can be a complex scenario with many difficult to determine variables, using the method allows for an improved rules and policy management based on previous trips, and real world measurements. The precision of the model increases each time the trip is taken, and may thus be more exact for commonly driven routes such as e.g. a morning commute. As these trips are more commonly driven, it will also yield greater long term advantages by finding even small optimizations in the operation of the controllable units for these trips.

In one embodiment of the disclosure, the method further comprises:
  transmitting said set of control result values to a remote data unit, and
  receiving said updated control values from said remote data unit, and where said step of determining, based on said set of control result values, an updated set of control values for the actually driven route, is performed at said remote data unit.

This allows for the transmission of data relating to the trip to be transmitted to a remote data unit, be processed there to determine the updated set of control values, and then have the remote data unit transmit the updated set of control values. This may be used to e.g. allow for more processing power to be used in determining the updated set of control values. For instance, the remote data unit may be equipped with a greater amount of processing capacity than the vehicle, and thus more demanding calculations or simulations may be performed to better determine the updated set of control values.

In one embodiment of the disclosure, the at least one controllable unit of the vehicle is an energy unit, and said rules and policies relate to managing energy usage of said energy unit, and said control values and sets of control values respectively are energy unit control values and sets of energy unit control values relating to the control of said energy unit of the vehicle. Further, the set of control result values are energy unit control result values are indicative of the energy usage during the predetermined interval, and said updated set of control values is an updated set of energy unit control values.

In one embodiment of the disclosure, the vehicle is a Hybrid Electric Vehicle, and the at least one controllable unit is an internal combustion engine arranged to charge said battery unit. Further, the step of controlling the at least one energy unit based on the energy usage model may comprise controlling the internal combustion engine by transmitting Engine On or Engine Off requests to said internal combustion engine.

This allows the method to be used for controlling the energy usage of a Hybrid Electric Vehicle, HEV, where an internal combustion engine charges a battery unit from which the electric motor of the HEV draws its power. The method may thus be used to optimize when such an internal combustion engine is activated based on entire driven routes, rather than only e.g. momentary measurements of State of Charge of the battery or power requests from the user, and thus an improved energy usage is achieved by the method.

In one embodiment of the disclosure, the set of control result values further includes at least one of: Driver Power Request Levels, GPS positions, Speed, Engine Temperature, Battery Temperature, Vehicle Cabin Temperature or Timestamps.

Using additional information allows for more accurate control values to be determined by the method, further improving the control values. Also, using data regarding e.g. Timestamps may be useful e.g. in determining the active route and/or determining which set of control values corresponds to the active route. As an additional example, timestamps may be used to differentiate different sets of control values with the same route, such as one set being used e.g. when starting your morning commute at one time, and a different set being used if the start of the morning commute was delayed by e.g. 30 minutes. As the traffic situation may be different during the two different times, caused by e.g. traffic congestion often occurring during specific times, a different set of control values may be more appropriate for the given trip.

In one embodiment of the disclosure, the set of control values is a control model. Preferably, the control model is expressed as at least one of: a Markov Decision Process, MDP, a Continuous-Time Markov Process, CTMP, or a Transition Rate Matrix, TRM. In a further embodiment of the disclosure, the predetermined intervals in the step of recording a set of data parameters relevant to a driving corresponds to transitions in the control model. The control result values can be seen to correspond to what is often referred to as a reward in such a MDP, CTMP or TRM. In another embodiment of the disclosure, the transition from one state to another also corresponds to a controlling of the controllable unit during that transition.

Using one of the above referred to model types to represent the control model allows the use of known methods for simulating, or finding or improving the solutions to such model types in determining an updated set of control values.

In one embodiment of the disclosure, the method further comprises:
  determining, based on GPS positions analyzed at predetermined time intervals, that the active route has changed, and
  determining, based on the GPS positions analysed, a new active route of the vehicle.

This allows deviations from the active route to be detected. If it is determined that the vehicle is no longer travelling on the path determined to be the active path, i.e. that the active route has changed, a new active route of the vehicle is determined. In a further embodiment of the disclosure, a new set of control values is also selected based on the new active route, and this new set of control values is thereafter used to control the controllable unit. The recording of control result values will continue, as this corresponds to the current trip, not the active route. At the end of the trip, the parameters are used to determine an updated set of control values for the actually driven route, regardless of whether this matched the active route or not.

In a further embodiment of the disclosure, the step of determining an updated set of control values for the actually driven route comprises running at least one simulation of the actually driven route based on the set of control result values. The updated set of control values is then determined based on said simulations.

Another object of the disclosure is achieved by a system for managing rules and policies in a vehicle, where the vehicle comprises at least one controllable unit. The system (10) comprises a management unit, and a memory unit associated with said management unit. The management unit may comprise one or more microprocessors, microcontrollers, programmable digital signal processors (DSP) or other programmable devices. The management unit may also, or instead, include one or more application specific integrated circuits (ASIC), programmable gate arrays or programmable array logic, programmable logic devices, or digital signal processors. Where the management unit includes a programmable device such as a microprocessor, microcontroller or programmable digital signal processor, the memory unit may store computer executable instructions that control operation of the programmable device and/or for performing the various operations and/or functions described herein.

The system (10) is arranged to determine an active route of the vehicle at the start of a driving of the vehicle, select a set of control values from a plurality of sets of control values being based on a set of previously driven routes and stored in the memory unit associated with the management unit, where one control value of said set of control values corresponds to one predetermined interval of the determined active route, control the at least one controllable unit based on the set of control values, record, at a predetermined interval, a set of control result values relevant to the current driving of the vehicle in said memory unit associated with the management unit, where one control result value corresponds to a predetermined interval of the determined active route which the vehicle has driven, determine an updated set of control values for the actually driven route at the end of the driving based on said recorded set of control values, and store said updated control values in the memory unit associated with the management unit.

In another embodiment of the disclosure, the system is arranged to communicate with a remote data unit and the system further comprises:

a transmitter arranged to transmit, to said remote data unit, said set of control result values, and a receiver arranged to receive, from said remote data unit, said updated set of control values, and where said determining of the updated set of control values for the actually driven route at the end of the driving based on said recorded set of control result values is performed at said remote data unit.

In another embodiment of the disclosure, the remote data unit is cloud based.

Another object of the disclosure is achieved by a vehicle comprising a system according to the embodiment.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Various embodiments of the disclosure will hereinafter be described in conjunction with the appended drawings to illustrate and not to limit the disclosure, wherein like designations denote like elements, and variations of the described embodiments are not restricted to the specifically shown embodiments, but are applicable on other variations of the disclosure.

Figure 1:
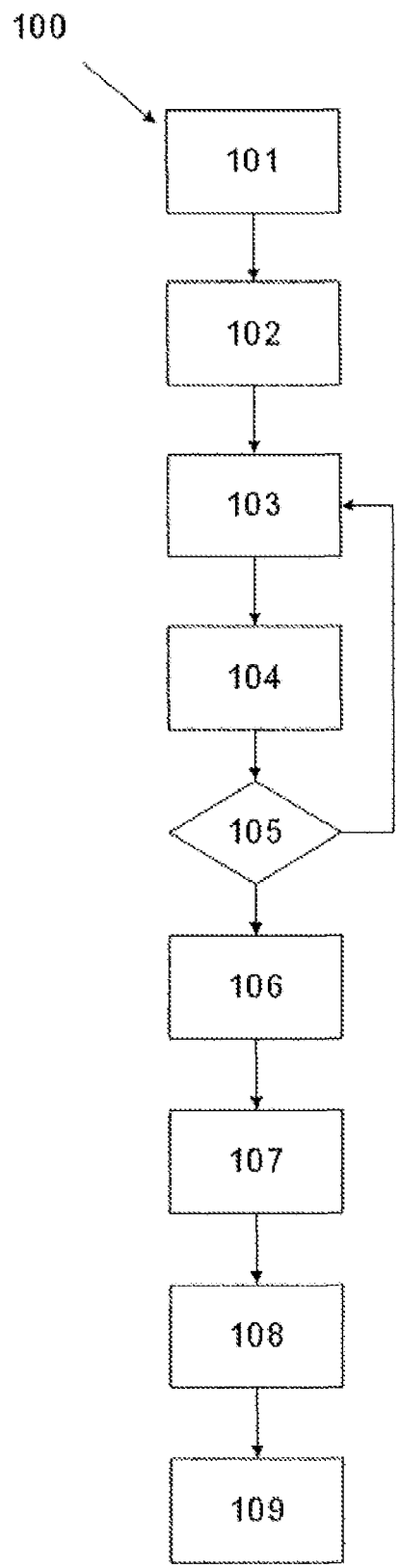
FIG. 1 shows a flowchart of a method for managing energy usage in a vehicle.

FIG. 1 shows a flowchart of a method 100 for managing rules and/or policies in a vehicle. The vehicle comprises at least one controllable unit. In step 101, an active route of the vehicle is determined. In step 102, a set of control values are then selected from a plurality of stored sets of control values, which are based on a set of previously driven routes. One control value corresponds to one predetermined interval of the determined active route. The intervals of the determined active route may correspond to a distance or a period of time. The intervals may be of different length depending on the requirements of the method. In step 103, the controllable unit is controlled based on the control values selected. In step 104, by recording for each interval a control result value, the result of the driving is recorded as a set of control result values. In step 105, it is determined whether the trip has ended. If it has not, the method returns to steps 103 and 104 by controlling the controllable unit and recording the control result. In step 106, if the trip has ended, the set of control values are transmitted to a remote data unit. In step 107, the set of control result values are used to determine an updated set of control values for the driven route. In step 108, the updated set of control values is received from the remote data unit. In step 109, the updated set of control values is stored.

The rules and or policies for managing the controllable unit may represent a number of different embodiments of controlling or managing a unit in a vehicle. For instance, the controllable unit may be an automatic gearbox being controlled to shift gears at intervals corresponding to the selected set of control values, a climate control system adapted to be controlled corresponding to the selected set of control values, selecting a propulsion source for a vehicle such as a Battery Electric Vehicle (BEV), Plug-In Hybrid Electric Vehicle (PHEV), when to activate an energy reserve in the form of a Kinetic Energy Recovery System (KERS) or Nitrous Oxide NOx, or controlling other propulsion parameters such as e.g. fuel injection. The controllable unit may be a Urea unit arranged to inject urea being controlled to inject urea into the exhaust stream of an engine unit. The controllable unit may be related to a diesel particulate filter unit, DPF, arranged to remove diesel particulate matter or soot from the exhaust gas of a diesel engine, to control the DPF or to control units influencing the DPF such as controlling the engine unit to increase the temperature of the DPF unit or metering additional fuel to activate the regeneration process of the DPF. The controllable unit may be an autonomous driving system controlling e.g. the speed or gear selection during autonomous drive. The controllable units may be lights outside or inside the vehicle lighting the road or the vehicle cabin. The control result values may be any value that is of interest to the control values, i.e. where a measurable effect of the control value may be found. Examples of this include emission levels, fuel consumption, temperatures, speed levels, driver power requests, battery State of Charge levels. Auxiliary information that may be relevant may be stored as well such as e.g. time and date or GPS positions.

Referring again to FIG. 1, an example of the present disclosure will now be described. FIG. 1 shows a flowchart of a method 100 for managing energy usage in a vehicle. The vehicle 20 comprises a controllable unit in the form of an energy unit 21. In step 101, at the start of a driving of the vehicle, an active route of the vehicle is determined. In step 102, a set of energy unit control values are then selected from a plurality of stored sets of energy unit control values, where the plurality of sets of energy unit control values are based on a set of previously driven routes. One energy unit control value corresponds to one predetermined interval of the determined active route. The intervals of the determined active route may correspond to a distance such as e.g. 50 meters, 100 meters, 200 meters, 600 meters or 1000 meters per interval, or a period of time such as e.g. 5 seconds, 30 seconds or 60 seconds. The intervals could be of different lengths in distance or time, which may be suitable for e.g. some routes with varying properties. Then, in step 103, at least one energy unit of the vehicle is controlled based on the set of energy unit control values which is selected. This is performed throughout the trip, for each interval of the determined active route. In step 104, during the driving of the vehicle, a set of energy unit control result values are recorded, where one energy unit control result value corresponds to a predetermined interval which the vehicle has driven. Each of the energy unit control result values are thus indicative of the energy usage during the predetermined interval, resulting from the controlling of the energy unit.

In step 105, it is determined whether the driving has ended, i.e. that the destination of the trip has been reached. If it is not the case that the driving has ended, the method 100 returns to step 103 controlling the vehicle. In step 106, after it is determined that the driving has ended, the set of energy control unit result values is transmitted to a remote data unit. In step 107, an updated set of energy unit control values for the actually driven route then is determined at the remote data unit based on the set of energy unit control result values. In step 108, the updated energy unit control values are received from the remote data unit. In step 109, the updated set of energy unit control values is then stored. Thereby, when the active route is determined to be a previously driven route, the set of energy unit control values corresponding to that route will have been updated to further improve energy usage. As more and more trips are completed, more updated and improved sets of energy control values corresponding to that particular trip are achieved, the energy usage and thus energy economy of the vehicle is improved. If the driver has not completely followed the active route, i.e. the determined active route was inaccurate or has changed, the values recorded for the actually driven route may still be used for determining the updated set of energy unit control values for the actually driven route. The method may additionally comprise determining that the active route has changed, by e.g. GPS positions analyzed, such as if the vehicle has left the determined active route. A new active route may then be determined, and a different set of energy control values is selected. The remote data unit may be a remote unit located within the vehicle. Preferably the remote data unit is cloud based, also known as a cloud computing infrastructure. Preferably the communication, i.e. transmitting and receiving, with the cloud is performed wirelessly. Optionally, the steps 106, 108 of transmitting the energy unit control result values and receiving the updated energy unit control values may be omitted if they are not necessary, such as e.g. when sufficient computing power is available to not warrant such transmitting and receiving.

The at least one energy unit can be one of a plurality of units in a vehicle 20. For instance, in a Hybrid Electric Vehicle (HEV), comprising an electric propulsion unit 24 and a battery unit 23 adapted to power the electric propulsion unit, at least one energy unit 21 could be an internal combustion engine adapted to charge the battery unit. The internal combustion engine is controlled by transmitting Engine On or Engine Off requests to the internal combustion engine corresponding to the values of the selected set of energy unit control values selected for the determined active route. Other examples include energy buffers which are buffers where energy is temporarily stored such as e.g. the accumulation of cooling in an air-conditioning system. Other examples include the accumulation of heat in the engine, through which the heat in the engine may be allowed to rise above a normal threshold if it is known in the model that in future intervals the temperature will decrease, thus removing the need for cooling at the present moment. Additionally, an energy buffer could be a battery such as the 12V or 48V internal battery, being charged, whereby the decisions made could include whether to charge a battery with incoming energy or use it for other purposes, or affecting the load balance of the battery.

What the energy control result values comprise may depend on what type of unit the energy unit is. In the case of a HEV vehicle, where the energy unit is an internal combustion engine, the values comprise State of Charge (SoC) levels of the battery unit 23 powering the electric propulsion unit 24. Other examples of values which may be used are driver power request levels, propulsion energy needs, GPS positions, Speed Levels, Engine Temperature, Cabin Temperature, Battery Temperature, Date, Timestamps, Fuel Levels, Exhaust particle data. More than one of these values may be used in order to better determine the updated energy usage values.

Figure 2:
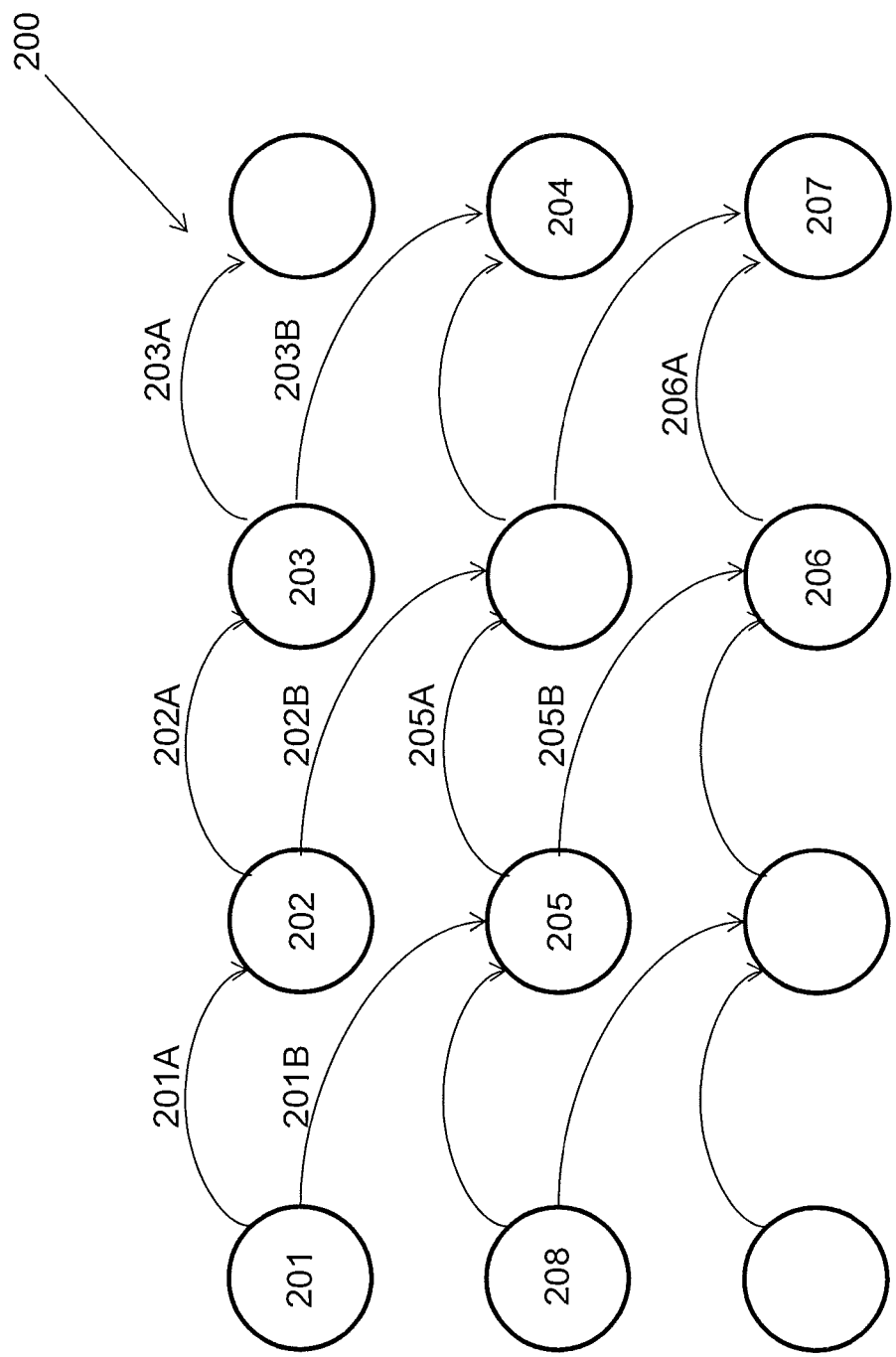
FIG. 2 shows an energy usage control model.

Preferably, set of control values corresponds to an control model 200. FIG. 2 shows such a control model which in the example is an energy unit control model in the form of a Markov Decision Process. Each state 201-208 represents a state of the vehicle at an interval of a travelled interval of the vehicle during the trip to the destination along the active route. Each transition 201A, 202A, 203A, 205A, 206A, 201B, 202B, 203B, 205B in the energy unit control model corresponds to an instance of controlling the energy unit for a predetermined interval of the determined active route. States 201, 202, 203, 205, 208 have two possible transitions 201A, 202A, 203A, 205A, 201B, 202B, 203B, 205B to a future state, except state 206, which only has one transition, 206A, each transition out of a state corresponding to a different action of controlling the controllable unit or energy unit. In the shown example, using the HEV (Hybrid Electric Vehicle) with an internal combustion engine charging the batteries, the two transitions represent an Engine On or Engine Off request being issued and followed during the predetermined time interval. In order for the energy usage model to continuously improve and better itself, a learning algorithm such as Q-Learning, Temporal Difference Learning or a State-Action-Reward-State-Action, SARSA, algorithm is employed to determine the next transition. This means that occasionally, the transition will be chosen not in order to optimize energy usage, but to explore the state space of the Markov Decision Process which will lead to a more improved model granting more optimal energy usage in the long run. Once the predetermined interval of the active route has been travelled (either measured in distance or time), the energy unit control result value resulting from the controlling during the previous transition of the model is recorded along with the transition it belonged to. In the example of the HEV vehicle, this is the State of Charge level or State of Charge level change resulting from the step of controlling the internal combustion engine. The next transition is then chosen until the active route has changed or the destination has been reached. As part of the step of determining an updated set of energy unit control values, the energy unit control result value is propagated backwards in the model so that the value function of each state accurately represents the expected total systemic result of that transition, such that in each decision on which transition to choose, the full active remaining route is considered, not just the next transition. This is done using e.g. Dynamic Programming, Policy Iteration, Value Iteration. As the computational complexity of such a task may be relatively large, this is preferably performed at the remote data location, e.g. the cloud.

In FIG. 2, the energy unit control model shows an example of an energy unit control model 200 corresponding to a specific route, being used to control an internal combustion engine. Each state 201-208 represents a state of the vehicle at an interval of a travelled interval of the vehicle during the trip to the destination along the active route. Initially, the active route for the trip is determined to select this particular energy unit control model. At each interval, a transition is selected corresponding to a controlling of the internal combustion engine by transmitting an Engine On or an Engine Off request. The internal combustion engine is then controlled as the vehicle travels along the interval. Each interval is associated with an expected result, which is used to determine which transition, and thus how to control the engine, to choose. Some of the states in FIG. 2 are numbered 201-207. Some of these states have two transitions 201A, 202A, 203A, 205A, 206A and 201B, 202B, 203B, 205B, apart from state 206, which only possesses an A-transition 206A, where the A-transitions, 201A, 202A, 203A, 205A, 206A represent the Engine On choice, and the B-transitions 201B, 202B, 203B, 205B represent the Engine Off choice. A first example of a part of a trip to a destination could involve entering states 201, 202, 203 and 204. This is achieved by, at predetermined intervals, choosing transition 201A, 202A and 203B. The internal combustion engine is thus turned on for the first two intervals, and turned off for the final interval. A second example of the same part of a trip to a destination could instead involve entering states 201, 205, 206 and 207 by traversing transitions 201B, 205B, and 206A, whereby the internal combustion engine is turned off for the first two intervals and turned on for the final interval. The first example would lead to more fuel being used as the internal combustion engine is turned on for an additional interval, whereas in the second example, the SoC levels of the battery unit would drop as the internal combustion engine is only recharging it for one interval. Which of these examples would be chosen for a part of a trip to a destination would depend on a multitude of factors. For instance, if the trip is almost finished at the end of the examples, it may be preferable to choose the example which uses the internal combustion engine less, but instead uses more battery power, as the batteries may have an opportunity to recharge at the end of a trip. If the trip features a lot of braking, it may be preferable to use battery power earlier as additional battery power may be recovered from braking. In certain states such as e.g. where the SoC is low, one transition may be disabled, and the choice may be limited to controlling the internal combustion engine to be turned on, such as in the case of state 206. Additionally, in states which represent an end of e.g. the trip, part of a trip or active route there are no transitions leaving the state as this state is considered a final state, e.g. states 204 and 207. State 201 does not represent the only possible initial state, rather this will depend on the current state of the vehicle, e.g. having a lower State of Charge at the beginning of the drive such as when driving home from the store could mean starting in state 208. After having travelled each interval, the effect of the choice is measured, in this example the SoC levels of the battery unit, and recorded as an energy unit control result value. This value is used to determine the expected value of entering each state, such that each state contains data regarding the total expected future energy unit control result value resulting in entering that state. After the trip to the destination has been completed, the energy unit control result values are transmitted to a cloud computing infrastructure, where they are processed to determine an updated energy unit control model for the route.

In a real world scenario, the control model 200 may be larger. The intervals may be either shorter or longer or even a time interval rather than a distance. A commute of 15 kilometers divided into intervals which are 100 meters long would require 150 intervals. Additionally, while the example uses two different choices available, Engine On or Engine Off, additional choices could be used for other energy units, which would mean that each or some states 201, 202, 203, 205, 206 could have more than two transitions 201A, 202A, 203A, 205A, 206A, 201B, 202B, 203B, 205B available.

Figure 3:
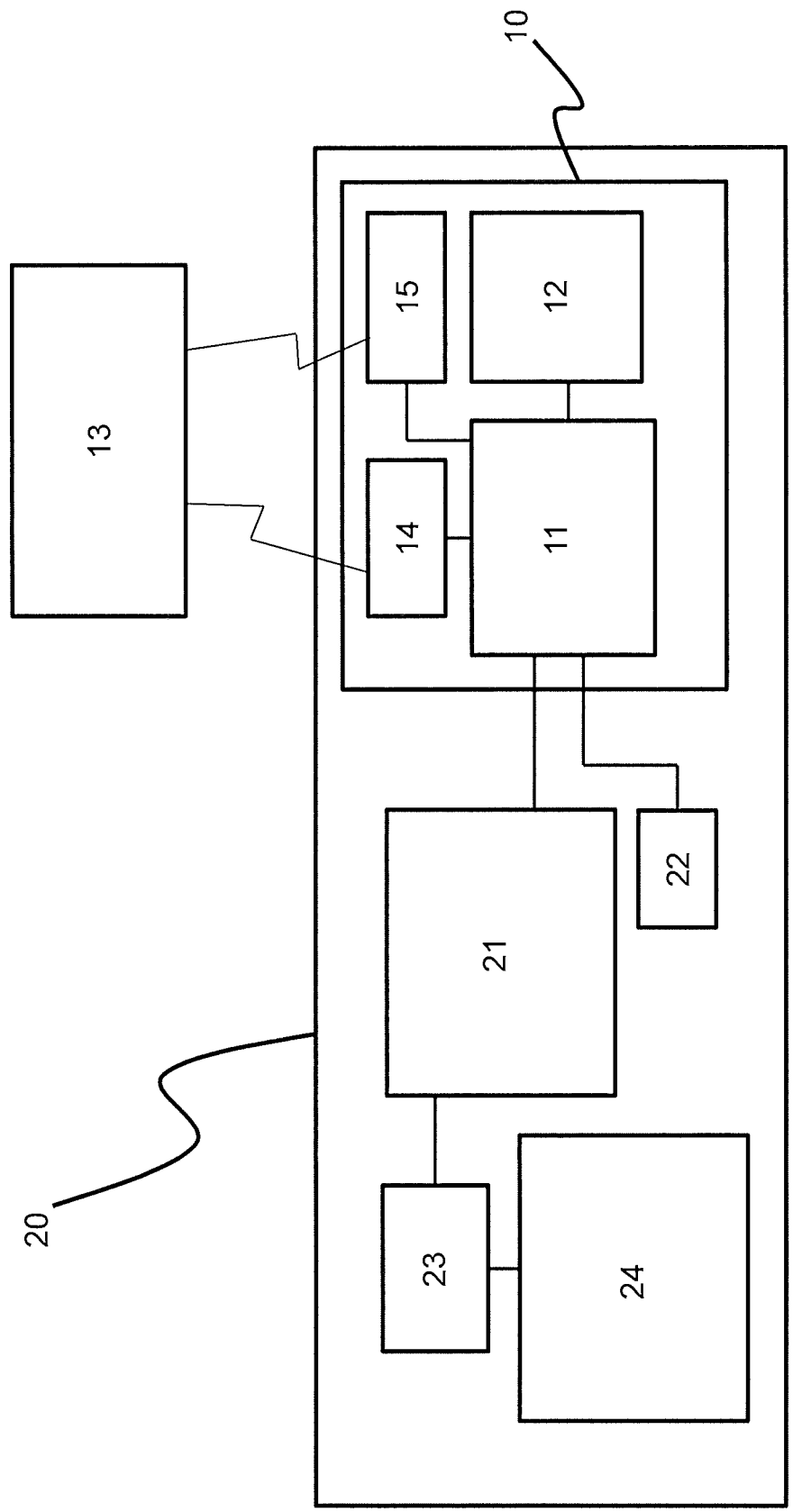
FIG. 3 shows a system for managing energy usage in a vehicle.

FIG. 3 shows a system 10 for managing energy usage in a vehicle 20. The vehicle comprises at least one energy unit 21. In the example shown in FIG. 3, the vehicle is an HEV (Hybrid Electric Vehicle), and the energy unit is an internal combustion engine arranged to charge a battery unit 23 which powers an electric propulsion unit 24 used to propel the vehicle. The system comprises an energy management unit 11, and a memory unit 12 associated with said energy management unit. The energy management unit 11 may comprise one or more microprocessors, microcontrollers, programmable digital signal processors (DSP) or other programmable devices. The energy management unit 11 may also, or instead, include one or more application specific integrated circuits (ASIC), programmable gate arrays or programmable array logic, programmable logic devices, or digital signal processors. Where the energy management unit 11 includes a programmable device such as a microprocessor, microcontroller or programmable digital signal processor, the memory unit 12 may store computer executable instructions that control operation of the programmable device and/or for performing the various operations and/or functions described herein.

The system 10 is arranged to determine an active route of the vehicle at the start of a driving of the vehicle, select a set of energy unit control values from a plurality of sets of energy unit control values being based on a set of previously driven routes and stored in the memory unit associated with the energy management unit, where one energy unit control value of said set of energy unit control values corresponds to one predetermined interval of the determined active route. The system is arranged to control the at least one energy unit based on the set of energy unit control values, and record, at a predetermined interval, a set of energy unit control result values relevant to the current driving of the vehicle in said memory unit associated with the energy management unit, where one energy unit control result value corresponds to a predetermined interval of the determined active route which the vehicle has driven. The system is further arranged to determine an updated set of energy unit control values for the actually driven route at the end of the driving based on said recorded set of energy unit control values, and store said updated energy unit control values in the memory unit associated with the energy management unit.

The system (10) further comprises a transmitter 14 arranged to transmit, to a remote data unit 13, said set of energy unit control result values, and a receiver 15 arranged to receive, from said remote data unit, the updated set of energy unit control values. In the example shown, the remote data unit is a cloud computing infrastructure, also referred to as a cloud or cloud based unit. Preferably, the remote data unit is arranged to determine the updated set of energy unit control values for the actually driven route at the end of the driving based on said recorded set of energy unit control result values. Preferably, the transmitter and the receiver are combined in to a single unit. Alternatively, the transmitter and receiver may be part of the vehicle rather than the system, in which case the system may be able to utilize the vehicles transmitter and receiver for communication with the remote data unit. The remote data unit may, as an option, be located within the vehicle. The remote data unit may comprise one or more microprocessors, microcontrollers, programmable digital signal processors (DSP) or other programmable devices. The remote data unit may also, or instead, include one or more application specific integrated circuits (ASIC), programmable gate arrays or programmable array logic, programmable logic devices, or digital signal processors. Where the remote data unit includes a programmable device such as a microprocessor, microcontroller or programmable digital signal processor, the remote data unit may further comprise a memory for storing computer executable instructions that control operation of the programmable device and/or for performing the various operations and/or functions described herein.

The vehicle further comprises a GPS unit 22 which is arranged to receive GPS positions. The system 10 is arranged to determine if the active route has changed based on these GPS positions. If the active route is determined to have changed, the system 10 determines a new active route of the vehicle 20 and selects a new set of energy unit control values corresponding to the new active route.

It should be noted that the system is not limited to energy units, but may instead comprise a controllable unit according to other embodiments of the disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for managing rules or policies in a vehicle, the vehicle comprising at least one controllable unit, the method performed by a management unit and a memory unit associated with the management unit, the method comprising:
    determining, at the start of a driving, an active route of the vehicle;
    dividing the determined active route into a plurality of non-overlapping predetermined intervals,
    selecting a set of control values from a plurality of stored sets of control values, the plurality of stored sets of control values being based on a set of previously driven routes, where the selected set of control values corresponds to the determined active route, wherein each control value of the selected set of control values corresponds to one of the plurality of predetermined intervals of the determined active route;
    controlling the at least one controllable unit based on the selected set of control values;
    recording, during current driving of the vehicle, a set of control result values, wherein each control result value corresponds to one of the plurality of predetermined intervals of the determined active route which the vehicle has driven, and wherein the control result values are indicative of a result of the controlling during the corresponding predetermined interval;
    determining, at the end of the driving based on the set of control result values, an updated set of control values for an actually driven route; and
    storing the updated set of control values, wherein the set of control values corresponds to a control model;
    wherein the at least one controllable unit of the vehicle is an energy unit, the rules or policies relate to managing energy usage of the energy unit, the control values and sets of control values respectively are energy unit control values and sets of energy unit control values relating to the control of the energy unit of the vehicle, the set of control result values are energy unit control result values indicative of the energy usage during the corresponding predetermined interval, and the updated set of control values is an updated set of energy unit control values; and
    wherein the vehicle is a Hybrid Electric Vehicle, the vehicle further comprises an electric propulsion unit and a battery unit adapted to power the electric propulsion unit, and the at least one energy unit is an internal combustion engine arranged to charge the battery unit, and wherein controlling the internal combustion engine is based on the selected set of energy unit control values;
    wherein the control model comprises a plurality of vehicle states and a plurality of transitions between the vehicle states, each transition corresponding to one of the plurality of predetermined intervals, wherein each predetermined interval is associated with an expected energy unit control result value that is determined based on the recorded set of energy unit control result values, wherein each vehicle state contains data regarding the total expected future energy unit control result value based on entering that state, and wherein each transition corresponding to a predetermined interval is selected based on all of the determined active route remaining.

2. The method according to claim 1 further comprising:
    transmitting the set of control result values to a remote data unit; and
    receiving the updated control values from the remote data unit;
    wherein determining, based on the set of control result values, an updated set of control values for the actually driven route, is performed at the remote data unit.

3. The method according to claim 1 where the set of control result values further includes at least one of: Driver Power Request levels, Propulsion Energy Needs, GPS positions, Speed Levels or Timestamps.

4. The method according to claim 3 where controlling the at least one controllable unit corresponds to a transition in the control model.

5. The method according to claim 1 where recording a set of control result values corresponds to a transition in the control model.

6. A system for managing rules and policies in a vehicle, where the vehicle comprises at least one controllable unit, the system comprising:
    a management unit; and
    a memory unit associated with the management unit;
    wherein the system is configured to:
        determine an active route of the vehicle at the start of a driving of the vehicle;
        divide the determined active route into a plurality of non-overlapping predetermined intervals,
        select a set of control values from a plurality of sets of control values being based on a set of previously driven routes and stored in the memory unit associated with the management unit, where the selected set of control values corresponds to the determined active route, wherein each control value of the selected set of control values corresponds to one of the plurality of predetermined intervals of the determined active route;

control the at least one controllable unit based on the selected set of control values;

record, at a predetermined interval, a set of control result values relevant to current driving of the vehicle in the memory unit associated with the management unit, wherein each control result value corresponds to one of the plurality of predetermined intervals of the determined active route which the vehicle has driven, and wherein the control result values are indicative of a result of controlling the at least one controllable unit during the corresponding predetermined interval;

determine an updated set of control values for an actually driven route at the end of the driving based on the recorded set of control values; and store the updated control values in the memory unit associated with the management unit, wherein the set of control values corresponds to a control model;

wherein the at least one controllable unit of the vehicle is an energy unit, the rules or policies relate to managing energy usage of the energy unit, the control values and sets of control values respectively are energy unit control values and sets of energy unit control values relating to the control of the energy unit of the vehicle, the set of control result values are energy unit control result values indicative of the energy usage during the corresponding predetermined interval, and the updated set of control values is an updated set of energy unit control values; and wherein the vehicle is a Hybrid Electric Vehicle, the vehicle further comprises an electric propulsion unit and a battery unit adapted to power the electric propulsion unit, and the at least one energy unit is an internal combustion engine arranged to charge the battery unit, and wherein the energy management unit is arranged to control the internal combustion engine based on the selected set of energy unit control values;

wherein the control model comprises a plurality of vehicle states and a plurality of transitions between the vehicle states, each transition corresponding to one of the plurality of predetermined intervals, wherein each predetermined interval is associated with an expected energy unit control result value that is determined based on the recorded set of energy unit control result values, wherein each vehicle state contains data regarding the total expected future energy unit control result value based on entering that state, and wherein each transition corresponding to a predetermined interval is selected based on all of the determined active route remaining.

7. The system according to claim 6, the system arranged to communicate with a remote data unit, the system further comprising:

a transmitter arranged to transmit, to the remote data unit, the set of control result values; and a receiver arranged to receive, from the remote data unit, the updated set of control values;

where the determined updated set of control values for the actually driven route at the end of the driving based on the recorded set of control result values is performed at the remote data unit.

8. The system according to claim 6 where the vehicle further comprises a GPS unit arranged to receive GPS positions, and where the system is arranged to determine that the active route has changed based on the GPS positions received by the GPS unit, whereupon the system determines a new active route of the vehicle.

9. A vehicle comprising:

at least one controllable unit; and a system for managing rules and policies in the vehicle, the system comprising a management unit, and a memory unit associated with the management unit, wherein the system is configured to:

determine an active route of the vehicle at the start of a driving of the vehicle, divide the determined active route into a plurality of non-overlapping predetermined intervals, select a set of control values from a plurality of sets of control values being based on a set of previously driven routes and stored in the memory unit associated with the management unit, where the selected set of control values corresponds to the determined active route, wherein each control value of the selected set of control values corresponds to one of the plurality of predetermined intervals of the determined active route, control the at least one controllable unit based on the selected set of control values, record, at a predetermined interval, a set of control result values relevant to current driving of the vehicle in the memory unit associated with the management unit, wherein each control result value corresponds to one of the plurality of predetermined intervals of the determined active route which the vehicle has driven, and wherein the control result values are indicative of a result of control of the at least one controllable unit during the corresponding predetermined interval, determine an updated set of control values for an actually driven route at the end of the driving based on the recorded set of control values, and store the updated control values in the memory unit associated with the management unit, wherein the set of control values corresponds to a control model, wherein the at least one controllable unit of the vehicle is an energy unit, the rules or policies relate to managing energy usage of the energy unit, the control values and sets of control values respectively are energy unit control values and sets of energy unit control values relating to the control of the energy unit of the vehicle, the set of control result values are energy unit control result values indicative of the energy usage during the corresponding predetermined interval, and the updated set of control values is an updated set of energy unit control values, and wherein the vehicle is a Hybrid Electric Vehicle, the vehicle further comprises an electric propulsion unit and a battery unit adapted to power the electric propulsion unit, and the at least one energy unit is an internal combustion engine arranged to charge the battery unit, and wherein the energy management unit is arranged to control the internal combustion engine based on the selected set of energy unit control values, wherein the control model comprises a plurality of vehicle states and a plurality of transitions between the vehicle states, each transition corresponding to one of the plurality of predetermined intervals, wherein each predetermined interval is associated with an expected energy unit control result value that is determined based on the recorded set of energy unit control result values, wherein each vehicle state contains data regarding the total expected future energy unit control result value based on entering that state, and wherein each transition corresponding to a predetermined interval is selected based on all of the determined active route remaining.

10. The method according to claim 1 where the control model comprises a Markov Decision Process, a Continuous-Time Markov Process and/or a Transition Rate Matrix.

11. The system according to claim 6 where the control model comprises a Markov Decision Process, a Continuous-Time Markov Process and/or a Transition Rate Matrix.

12. The vehicle according to claim 9 where the control model comprises a Markov Decision Process, a Continuous-Time Markov Process or a Transition Rate Matrix.

\* \* \* \* \*

UNITED STATES PATENT AND TRADEMARK OFFICE
CERTIFICATE OF CORRECTION

PATENT NO.        : 10,393,880 B2
APPLICATION NO.   : 14/850037
DATED             : August 27, 2019
INVENTOR(S)       : Rickard Arvidsson et al.

Page 1 of 1

It is certified that error appears in the above-identified patent and that said Letters Patent is hereby corrected as shown below:

In the Claims

Column 15, Line 11, Claim 10:
After "a Continuous-Time Markov Process"
Delete "and/or" and
Insert -- or --.

And

Column 15, Lines 15-16, Claim 11:
After "a Continuous-Time Markov Process"
Delete "and/or" and
Insert -- or --.

Signed and Sealed this
Thirty-first Day of March, 2020

Andrei Iancu
*Director of the United States Patent and Trademark Office*